US010028329B2

(12) United States Patent
Vajapeyam et al.

(10) Patent No.: US 10,028,329 B2
(45) Date of Patent: Jul. 17, 2018

(54) SYSTEM INFORMATION CHANGE NOTIFICATION FOR EXTENDED DISCONTINUOUS RECEPTION

(71) Applicant: QUALCOMM Incorporated, San Diego, CA (US)

(72) Inventors: Madhavan Srinivasan Vajapeyam, San Diego, CA (US); Alberto Rico Alvarino, San Diego, CA (US); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/227,310

(22) Filed: Aug. 3, 2016

(65) Prior Publication Data
US 2017/0127470 A1 May 4, 2017

Related U.S. Application Data

(60) Provisional application No. 62/250,990, filed on Nov. 4, 2015.

(51) Int. Cl.
H04W 68/00 (2009.01)
H04W 76/28 (2018.01)
(Continued)

(52) U.S. Cl.
CPC .......... *H04W 76/28* (2018.02); *H04W 68/02* (2013.01); *H04W 76/048* (2013.01); *H04W 68/00* (2013.01)

(58) Field of Classification Search
CPC .... H04W 76/048; H04W 68/02; H04W 68/00
(Continued)

(56) References Cited

U.S. PATENT DOCUMENTS 9,743,352 B2 * 8/2017 Hoglund ............ H04W 52/0216
2015/0173089 A1 * 6/2015 Baghel ................ H04W 72/082
370/329
(Continued)

FOREIGN PATENT DOCUMENTS

WO 2014161376 A1 10/2014
WO 2015016530 A1 2/2015
(Continued)

OTHER PUBLICATIONS

Huawei, et al., "Discussion on Extended DRX Cycle Mechanism", 3GPP Draft, R2-150508 Discussion on Extended DRX Mechanism, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 9, 2015-Feb. 13, 2015, Jan. 31, 2015 (Jan. 31, 2015), XP050952523, 5 pages. Retrieved from the Internet: URL:http://www.3gpp.org/ftpjtsg ran/ WG2 RL2/TSGR2 89/Docs/—retrieved on Jan. 31, 2015.
(Continued)

*Primary Examiner* — Amancio Gonzalez
(74) *Attorney, Agent, or Firm* — Nerrie M. Zohn

(57) ABSTRACT

A UE in an eDRX cycle may miss an SI change notification because the UE's receiver may be powered down during the entire modification period prior to the SI change. An apparatus for wireless communication at a base station may transmit SI, change the SI during a period of eDRX by a UE, and transmit the changed SI. The apparatus ensures that a UE receives an SI change notification, even when performing eDRX, by transmitting at least one notification associated with the changed SI after the transmission of the changed SI and during a paging occasion for the UE. In another aspect, an apparatus for wireless communication at a UE enters into an eDRX cycle and receives, after an SI change, a notification associated with the SI change.

24 Claims, 13 Drawing Sheets

(51) Int. Cl.
*H04W 68/02* (2009.01)
*H04W 76/04* (2009.01)

(58) Field of Classification Search
USPC .......................................................... 455/458
See application file for complete search history.

(56) References Cited

U.S. PATENT DOCUMENTS

2016/0112948 A1    4/2016  Liang et al.
2016/0192323 A1    6/2016  Kim et al.
2017/0048920 A1*   2/2017  Kim .................... H04W 76/048

FOREIGN PATENT DOCUMENTS

WO    2015020583 A1    2/2015
WO    2015020590 A1    2/2015

OTHER PUBLICATIONS

International Search Report and Written Opinion—PCT/US2016/055929—ISA/EPO—Dec. 15, 2016.

* cited by examiner

SYSTEM INFORMATION CHANGE NOTIFICATION FOR EXTENDED DISCONTINUOUS RECEPTION

CROSS-REFERENCE TO RELATED APPLICATION

This application claims the benefit of U.S. Provisional Application Ser. No. 62/250,990, entitled "SYSTEM INFORMATION CHANGE NOTIFICATION FOR EXTENDED DISCONTINUOUS RECEPTION" and filed on Nov. 4, 2015, which is expressly incorporated by reference herein in its entirety.

BACKGROUND

Field

The present disclosure relates generally to communication systems, and more particularly, to a system information (SI) change notification for extended discontinuous reception (eDRX).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Discontinuous reception (DRX) is a technique that may be used in wireless communications to conserve the battery life of a user equipment (UE). To perform DRX, the UE and the network may negotiate wake-up window periods during which the UE powers on the receiver to allow data transfer with the network. Outside of the wake-up window periods, the UE may turn the receiver off and enter a low or zero power state to conserve battery life.

At times, the network may make changes to System Information (SI). Before implementing the change, the network transmits an SI change notification so that a UE will be aware of the change and be able to receive the changed SI. However, the change notification may not adequately alert a UE performing extended DRX (eDRX) of the SI change.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Before implementing changes to SI, the network transmits an SI change notification to a UE so that the UE will be able to receive the changed SI. The network has defined modification periods, which may take into consideration a DRX cycle. An SI change notification may be sent to a UE performing conventional DRX via a paging mechanism during a modification period prior to the implementation of the SI change in the following modification period.

However, extended DRX (eDRX) enables a UE to power down the receiver for longer periods of time. The eDRX cycle may be much larger than the network's modification period, and the UE may miss the SI change notification because the receiver is powered down during the entire modification period during which the SI change notification is sent. The eDRX cycle may extend into or beyond a modification period that includes the SI change. Thus, the UE performing eDRX may still have the receiver powered off during the modification period prior to the upcoming modification period, and will not receive a SI change notification transmitted during the prior modification period. Therefore, the existing notification mechanism used to indicate an upcoming SI change may not adequately alert a UE performing eDRX about the SI change. The present disclosure provides a solution to the problem by enabling the base station to transmit an SI change notification, e.g., to a UE performing eDRX, after the SI change has occurred.

In an aspect of the disclosure, a method, a computer-readable medium, and an apparatus are provided. The apparatus transmits SI. The apparatus changes the SI during a period of eDRX by a UE and transmits the changed SI. The apparatus also transmits at least one notification associated with the changed SI after the transmission of the changed SI. The apparatus may transmit the at least one notification during a paging occasion for the UE. The at least one notification may comprise a value associated with the changed SI. The value may comprise a value tag that is incremented with each change in SI. The at least one notification may be transmitted during any of an invariant frame, an invariant paging occasion, or a paging occasion for a UE performing eDRX.

In another aspect of the disclosure, a method, a computer-readable medium, and an apparatus are provided. The apparatus enters into an eDRX cycle and receives, after an SI change during the eDRX cycle, a notification associated with the SI change. The notification may comprise a value associated with the SI change. The apparatus may determine if the value in the notification is different than a value associated with a previous notification and may acquire the SI when the value in the notification is different than the value associated with each change in SI.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
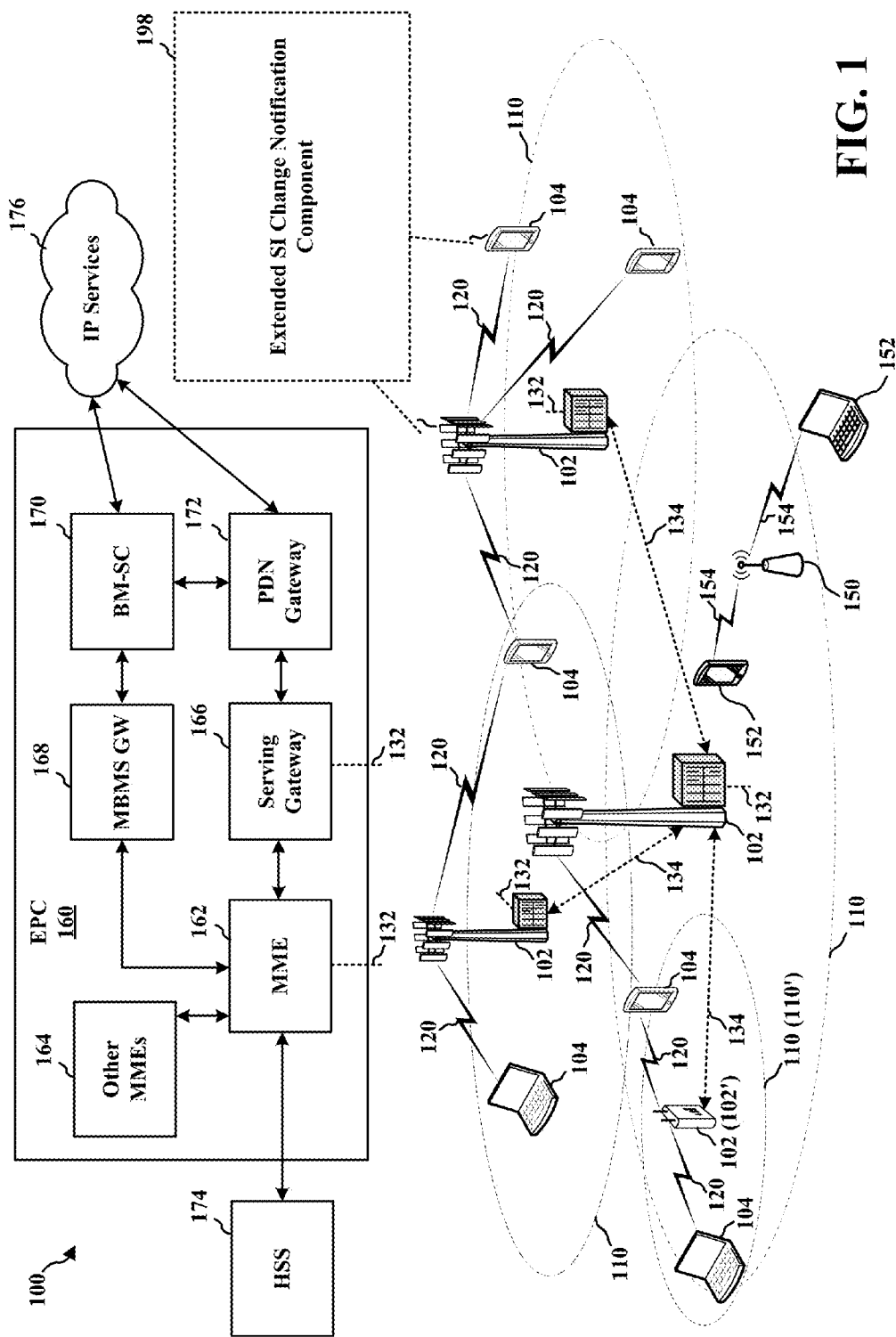
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 and UE 104 may be configured to include an extended SI change notification component (198). For example, in eNB, the extended SI change notification component 198 may enable the eNB 102 to send SI change notifications after the SI change has been implemented. In the UE 104, the extended SI change notification component 198 may enable the UE performing eDRX to receive and identify relevant SI change notifications, including those received after the SI change has been implemented.

Figure 2:
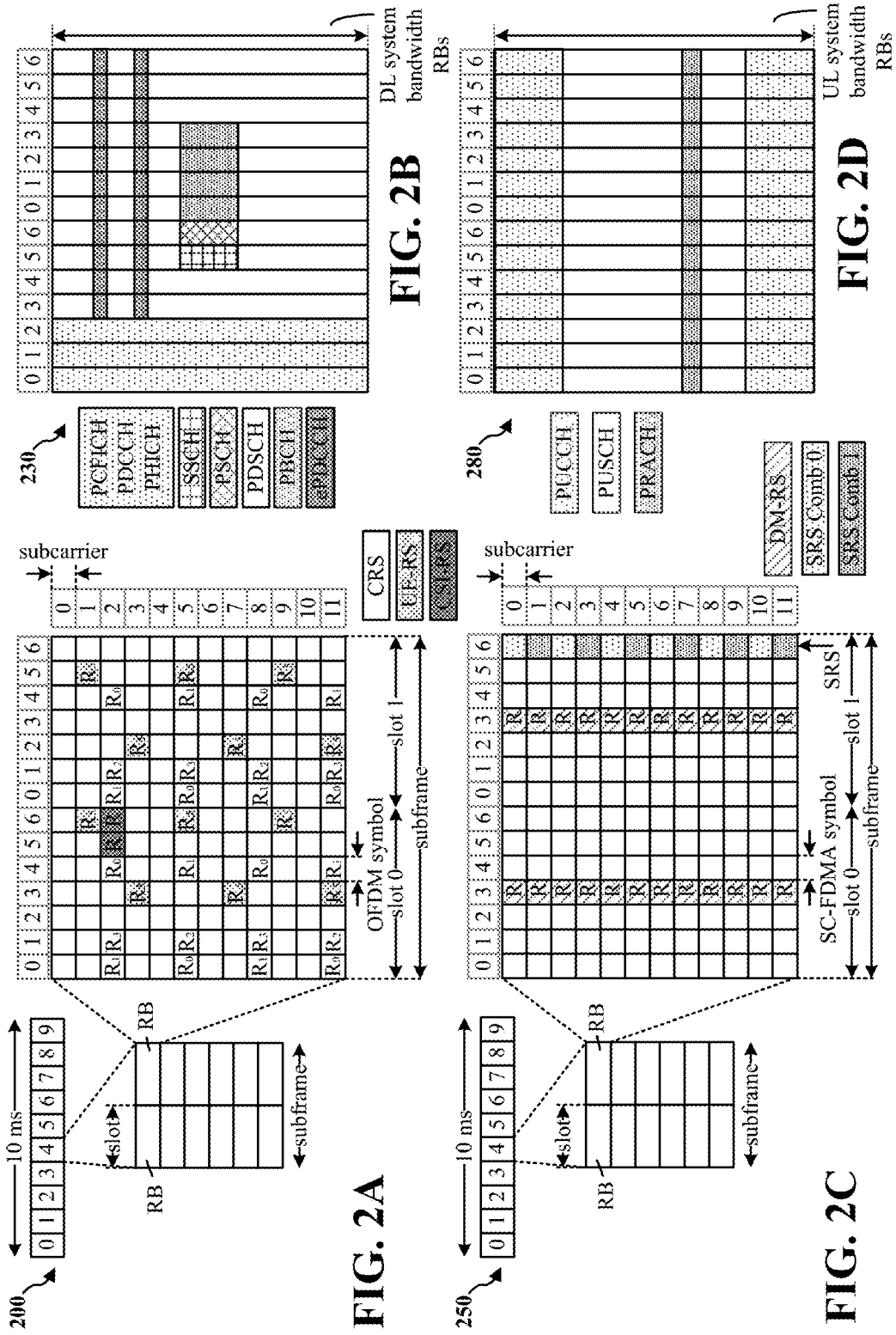
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
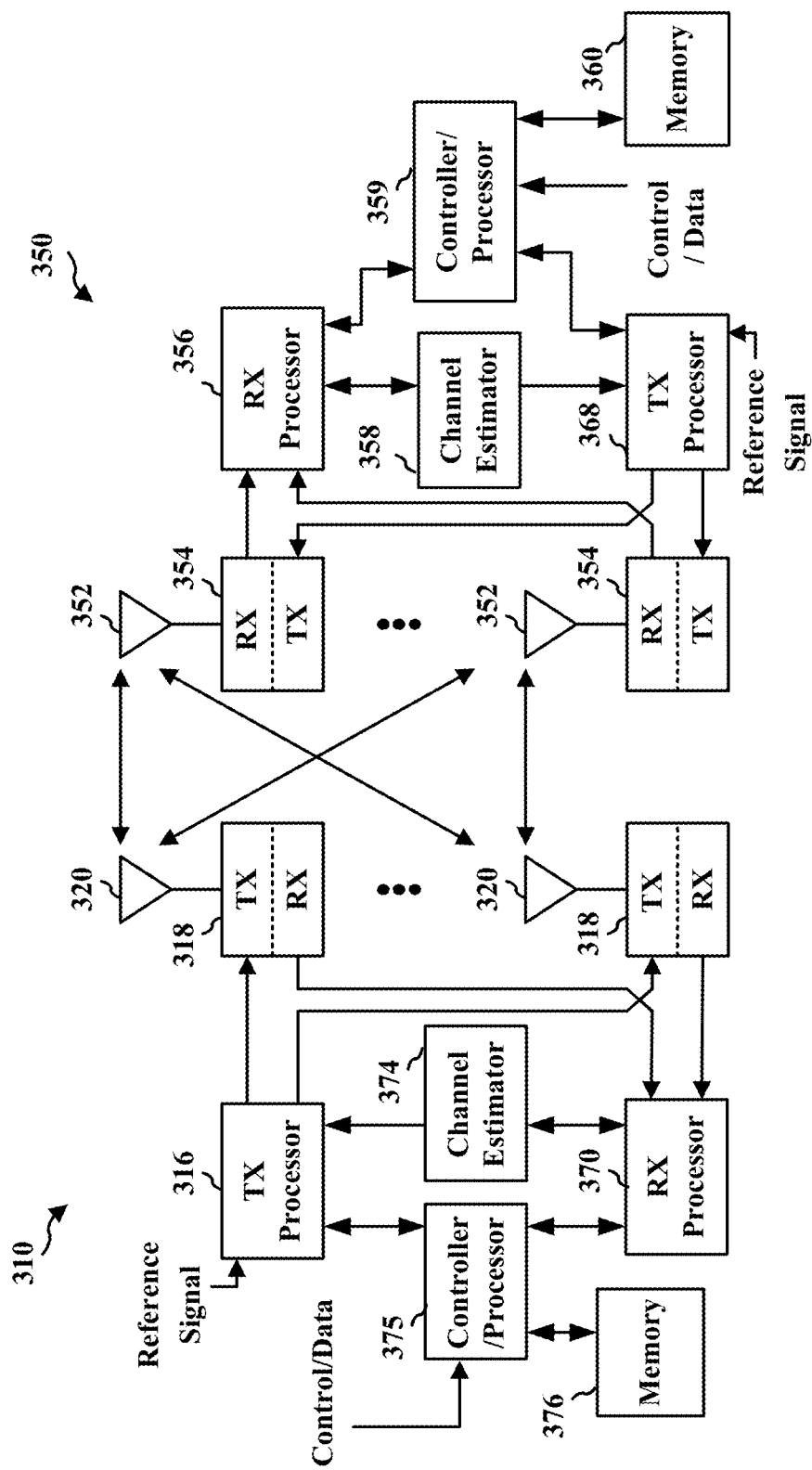
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

DRX is a technique that may be used in wireless communications to conserve the battery life of a UE. To perform DRX, the UE and the network may negotiate wake-up window periods during which the UE powers on the receiver to allow data transfer with the network. Outside of the wake-up window periods, the UE may turn the receiver off and enter a low or zero power state to conserve battery life.

Figure 4:
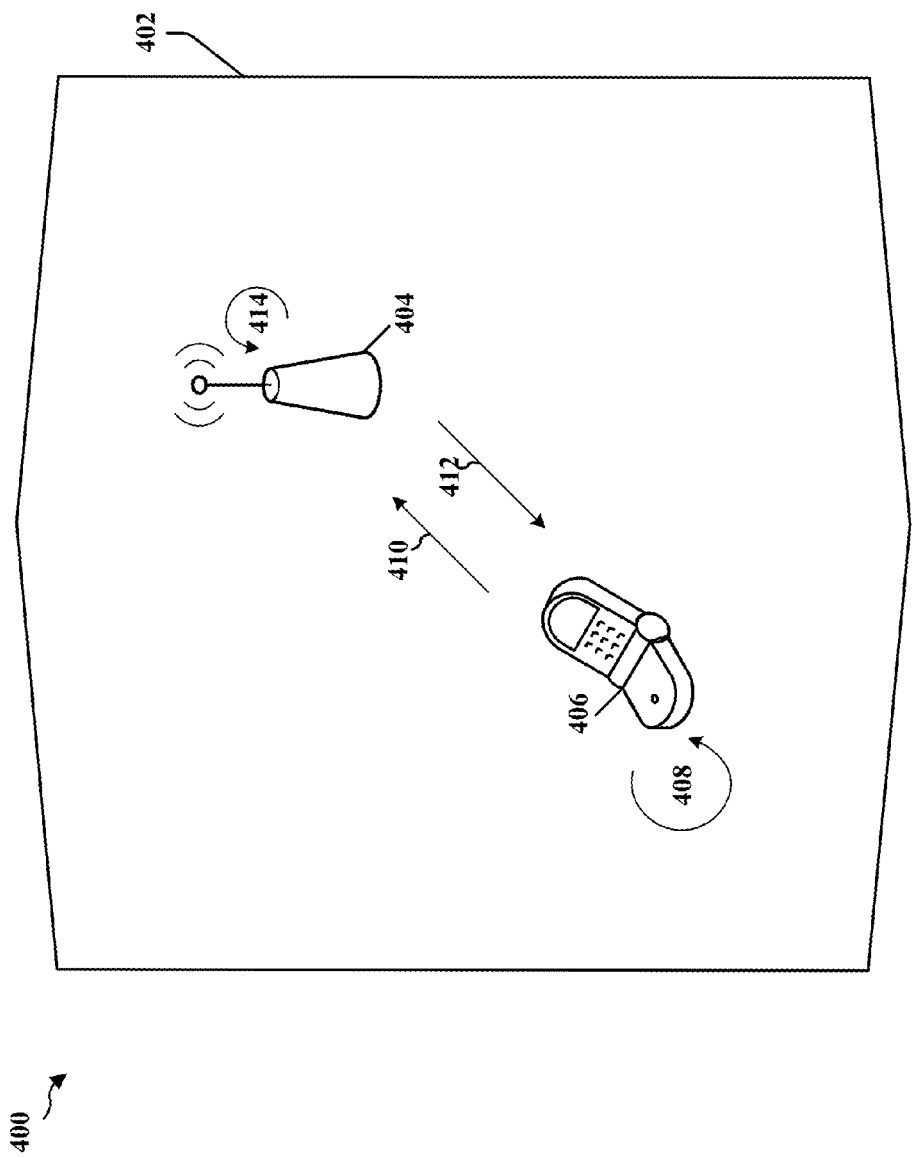
FIG. 4 is an example of a wireless communication system including an eNB and an eDRX UE in accordance with aspects presented herein.

FIG. 4 is a diagram of a wireless communications system 400 that includes a UE 406 performing DRX or eDRX that is in communication with a base station 404. UE 406 may be, e.g., UE 104, 350, and base station 404 may be eNB 102, 310. As illustrated in FIG. 4, serving cell 402 is the region served by base station 404. UE 406 and base station 404 may communicate 410, 412 with one another during DRX or eDRX wake-up window periods. In an aspect, the base station 404 and the UE 406 may negotiate 408, 414 the wake-up window periods during which the UE 406 that performs DRX to allow data transfer 410, 412 with the base station 404.

The base station 404 may determine that the SI for an upcoming modification period is due to change, and that a SI change notification needs to be transmitted to the UE 406. Conventional DRX is constrained by the SFN range. The SFN allows the UE to determine when certain things, such as an SI change, may occur and is constrained to, for example, 256 frames (e.g., 2.56 sec). The network may have defined modification periods, which may take into consideration a DRX cycle length.

When system information is set to change in an upcoming modification period, the eNB may send an SI change notification prior to implementing the change. For example, the SI change notification may be transmitted via a paging mechanism during a DRX wake-up window period in a modification period prior to an upcoming modification period that includes the SI change. When the SI change notification is received, the UE may acquire the new SI in the next modification period.

Figure 5:
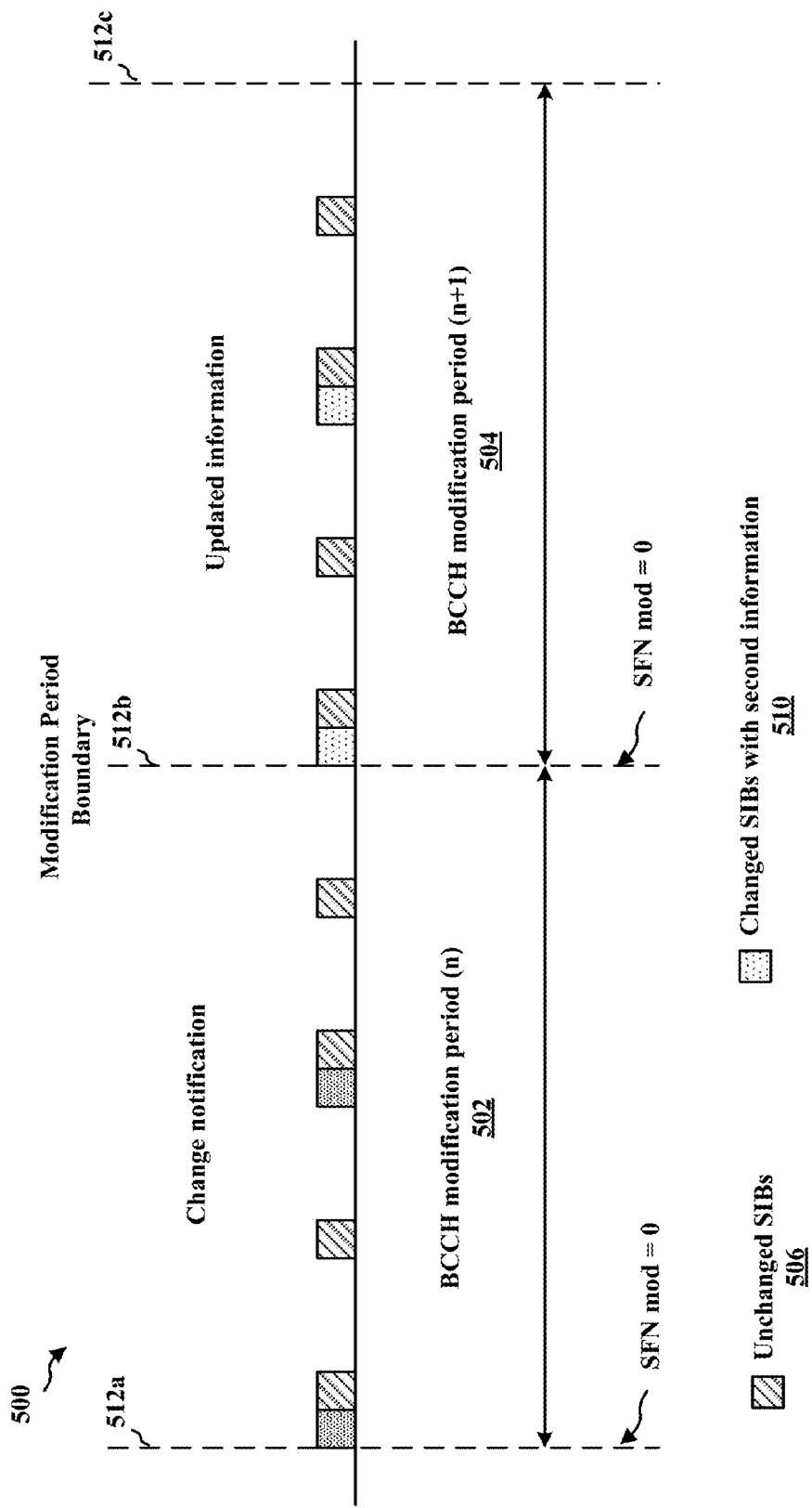
FIG. 5 illustrates aspects of example BCCH modification periods in accordance with aspects presented herein.

FIG. 5 is a diagram illustrating a change in system information 500 that occurs in broadcast control channel (BCCH) modification period (n+1) 504. In an aspect, SI may be updated and/or changed by a base station, e.g., 404. When the SI is to be changed, the SI change notifications may be transmitted multiple times to the UE during a BCCH modification period that precedes the SI change. Each BCCH modification period illustrated in the example depicted by FIG. 5 starts at SFN mod=0. The modification may be based at least in part on a default DRX cycle. For example, a BCCH modification period (in the number of radio frames) may be determined by the UE based on the following:

BCCH modification period (in the number of radio frames)=$T\_mod*k$

For example, T_mod may be a default DRX cycle (e.g., 320 ms, 640 ms, 1280 ms, 2560 ms) and k may be a modification period coefficient (e.g., 1, 2, 4, 8, 16). Both T_mod and k may be signaled to the UE by the base station in a system information block (SIB). FIG. 5 illustrates modification period boundary 512b between modification period n 502 and modification period n+1. The boundary 512*b* may be a common modification period boundary where all UEs start acquiring the new SI. The boundary 512*b* may be set at SFN m=0. Similarly, modification period boundary 512*a* may be a boundary between BCCH modification period n 502 and a previous BCCH modification period, e.g., n−1, and modification period boundary 512*c* may be a boundary between BCCH modification period n+1 504 and a following modification period, e.g., n+2.

In the example illustrated in FIG. 5, an SI change is set to occur during BCCH modification period (n+1) 504. Thus, the base station may transmit an SI change notification during BCCH modification period (n) 502. By receiving an SI change notification in BCCH modification period (n) 502, the UE may be made aware of the upcoming SI change in BCCH modification period (n+1) 504. The UE may then be able to acquire the new SI at the modification period boundary between BCCH modification period (n) 502 and BCCH modification period (n+1) 504.

The base station may use one of two mechanisms for notifying the UE that first information in certain SIBs 508 in BCCH modification period (n) 502 will change, e.g., to SIBs 510, in the upcoming BCCH modification period (n+1) 504. The information in other SIBs 506 may remain unchanged between the modification periods. The base station may transmit a paging message that includes a flag indicating whether or not the SI has changed.

UEs receiving the notification may be in various modes, e.g., in RRC_IDLE mode or in RRC_CONNECTED mode. UEs in RRC_CONNECTED mode may be expected to try to receive a paging message the same number of times per modification period as UEs in RRC_IDLE using a default paging cycle. The exact times at which UEs in RRC_CONNECTED mode need to attempt to receive a paging message may not be specified. The UEs may perform the attempts at convenient times, such as during a wake-up window period from the DRX, using any of the subframes which are configured for paging during the modification period. Since the base station has to notify all of the UEs in RRC-IDLE mode, a paging message may have to be sent in all subframes which are configured for paging (e.g., up to a maximum of subframes per radio frame) during the BCCH modification period (n) 502. RRC_CONNECTED mode UEs my utilize any of these subframes.

If the UE receives an SI change notification during BCCH modification period (n), then the UE may acquire the SI from the start of the BCCH modification period (n+1).

In the example illustrated in FIG. 4, the UE 406 may enter an eDRX cycle that is longer than the modification period located prior to the modification period during which the SI change occurs. The eDRX cycle may be much longer than multiple modification periods. The paging mechanism used to notify a UE of an upcoming SI change in a DRX scenario may not work for a UE that is in an eDRX cycle, because the eDRX cycle may be larger than BCCH modification period (n) 502. Thus, the paging mechanism illustrated in FIG. 5 that is used to indicate an upcoming SI change notification may not adequately alert a UE performing eDRX of an upcoming SI change. This is because the UE performing eDRX may still have the receiver powered off during the BCCH modification period (n) 502 prior to the modification period (n+1) 504 and will not receive the SI change notification. The UE performing eDRX may have the receiver powered off during the BCCH modification period in which the SI change is first implemented.

The present disclosure enables the base station to transmit an SI change notification to a UE performing eDRX after the SI change has occurred. After the UE 406 exits the eDRX cycle, the base station 404 may transmit 412 one or more SI change notifications to the UE 406 during eDRX wake-up window periods after the SI change has occurred.

Figure 6:
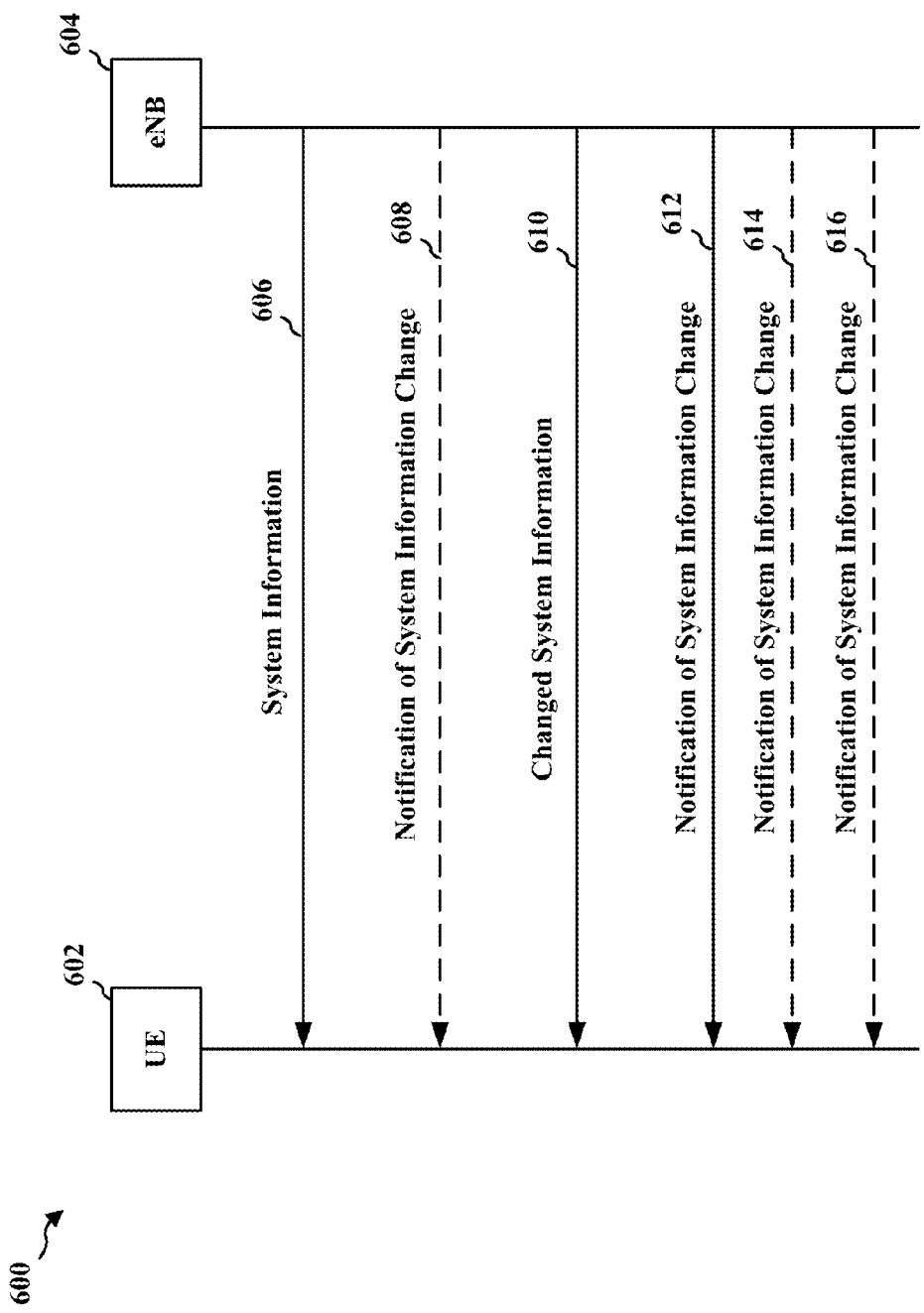
FIG. 6 illustrates an example of wireless communication between a UE and eNB in accordance with aspects presented herein.

FIG. 6 illustrates a diagram 600 showing communication between at least one UE 602 and eNB 604. UE 602 may correspond to any of 104, 350, 406, and eNB 604 may correspond to any of 102, 310, 404. The eNB 604 transmits SI 606 to UE 602. The eNB may determine that a change is to be made to the SI transmissions. UE 602 may be performing eDRX. Therefore, the eNB may transmit the changed SI 610 and after the change may transmit a SI change notification 612 to the UE 602. For example, the SI change notification can optionally be transmitted to the UE 602 multiple times, e.g., 614, 616, etc., to increase the chances of it being successfully received. Optional aspects are illustrated using a dashed line. As well, an SI change notification 608 may optionally be transmitted prior to the transmission of the changed SI at 610. Although only one change notification 608 is illustrated, the eNB may transmit multiple change notifications 608 prior to the changed SI transmission 610. This may be important to continue to provide notification to legacy UEs or to UEs that are not performing eDRX. For example, a UE performing DRX may still be able to receive the SI change notification 608 prior to the changed SI 610. This prior notification at 608 may also be important to notify UEs performing eDRX with a wake-up window within the BCCH modification period.

Figure 7:
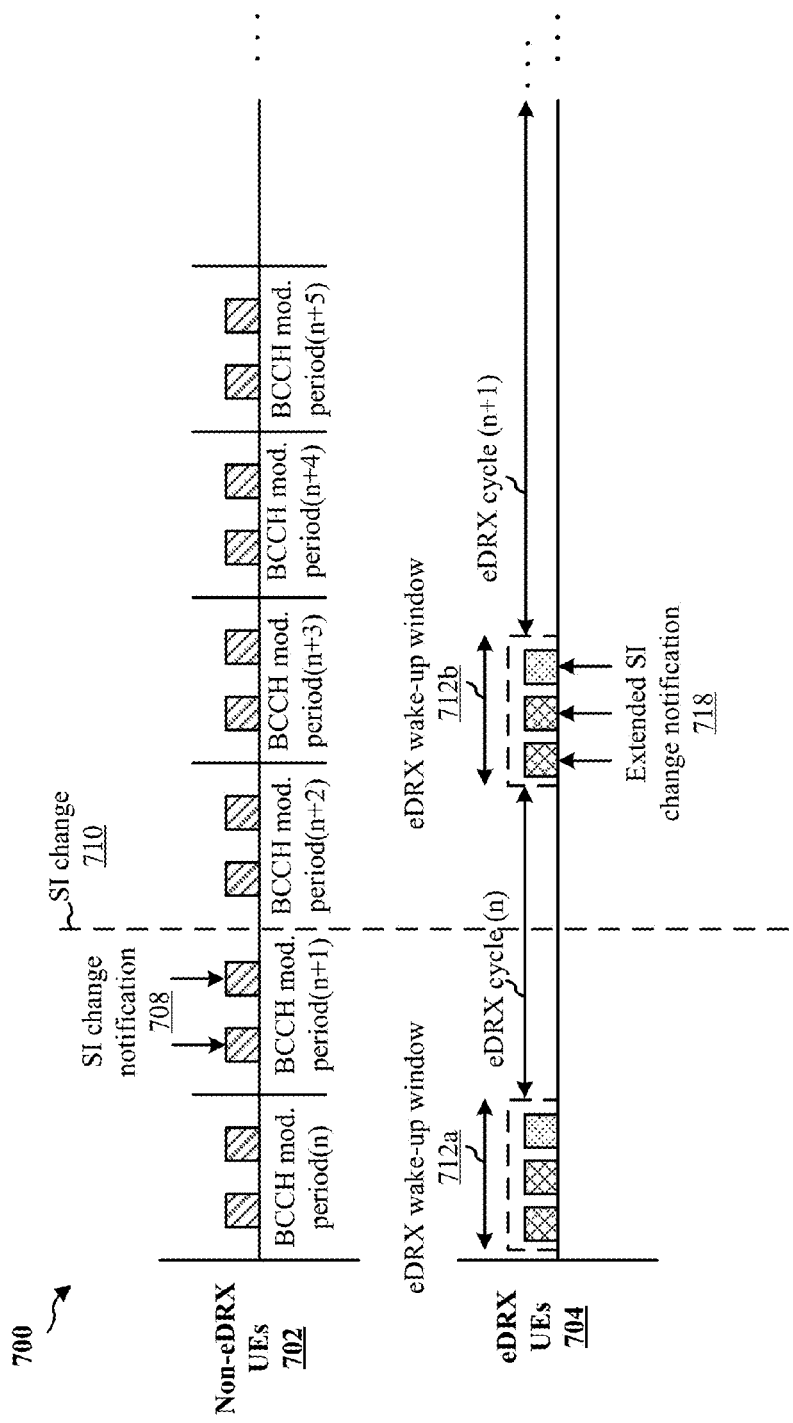
FIG. 7 illustrates example aspects of SI change notification in accordance with aspects presented herein.

FIG. 7 is a diagram illustrating paging mechanisms 700 that may be used by an base station to notify non-eDRX UEs 702 and eDRX UEs 704 of an SI change according to certain aspects. The base station may correspond, e.g., to any of 102, 310, 404, 604. In the example illustrated in FIG. 7 an SI change 710*a* is set to occur after BCCH modification period (n+1) associated with non-eDRX UEs 702 and during the eDRX cycle (n) for eDRX UEs 704.

As illustrated in FIG. 7, the base station (e.g., base station 404 illustrated in FIG. 4) may transmit an SI change notification 708 to non-eDRX UEs 702 during paging occasions 706 located in the BCCH modification period (n+1) prior to the SI change 710. However, since the SI change 710 occurs while the eDRX UEs 704 are in the eDRX cycle (n) that occurs after eDRX wake-up window 712*a*, the base station may also transmit an SI change notification after the SI change. For example, the base station may transmit the SI change notification in the BCCH modification period in which the SI change is implemented, as well as additional BCCH modification periods following the modification period in which the change is implemented.

In one example, the base station may wait until a subsequent eDRX wake-up window 712*b* to transmit an extended SI change notification 718 to the eDRX UEs 704. For example, the extended SI change notifications 718 may be transmitted in one or more paging occasions. The paging occasion may comprise a paging occasion specific to the eDRX UE, e.g., 714. Additionally or alternatively, the SI change notifications may be transmitted on certain paging frames (PF) and/or paging occasions (PO) that are invariant 716 to paging configuration. A PF and/or PO may be invariant if, regardless of the paging configuration or user equipment identification, the PF and/or PO remain a valid location for the receipt of an SI change notification. This may address an instance when the SI change itself modifies the paging channel configuration, which may cause the UE 406 to potentially miss an SI change notification transmitted by the base station 404 via paging. For example, an invariant PF may be located at one or more of SFNs 0, 256, 512, and/or 768, and an invariant PO may be located at subframe 9 (e.g., for FDD) and/or subframe 0 (e.g., for TDD).

SI change notifications may be transmitted at multiple paging occasions to ensure reliability and to cover multiple paging occasions for UE during the wake-up window period. For example, the base station may transmit the SI change notification during both paging occasions for the eDRX UE 714 and during invariant paging occasions 716.

The eDRX UE 704 may check multiple paging occasions for SI change notifications. The UE may check at least one of its assigned PFs or POs and may additionally or alternatively check at least one invariant PF or PO. The UE may select, e.g., the invariant PF or PO location that is closest to the wake up time for its assigned PF or PO.

Thus, the eDRX UEs 704 may acquire the SI change during the eDRX wake-up window 712b after the SI change 710.

The SI change notification(s) 718 transmitted to the eDRX UE may comprise repetitions of the SI change notification 708 transmitted to non-eDRX UEs. Alternately, the SI change notification(s) 718 transmitted to the eDRX UE may be separate from SI change notification(s) 708 that are transmitted to non-eDRX UEs, e.g., as in FIG. 5.

Each of the SI change notifications, e.g., 718 and/or 708, may include a value tag associated with the SI change so that if more than one of the notifications are received, the UE will be able to identify the SI change to which the notification applies. The value tag may be incremented with each SI change. The UE may receive multiple SI change notifications, and the value tag may enable the UE to determine that SI notifications are associated with a previously received SI change notification.

When an SI change notifications transmitted by the base station is received, the UE may determine whether the value tag included in the notification is the same as a value tag associated with a previously received SI change notification. When the UE determines that the value tag included in the notification is different than the value tag associated with the previous notification, the UE may acquire the new SI. The UE may store the value tag associated with the most recently acquired SI. The UE may then compare a newly received value tag associated a received SI change notification to the stored value tag. When the newly received value tag has a value that indicates a new change to the SI, the UE may acquire the new SI and store the newly received value tag.

Figure 8:
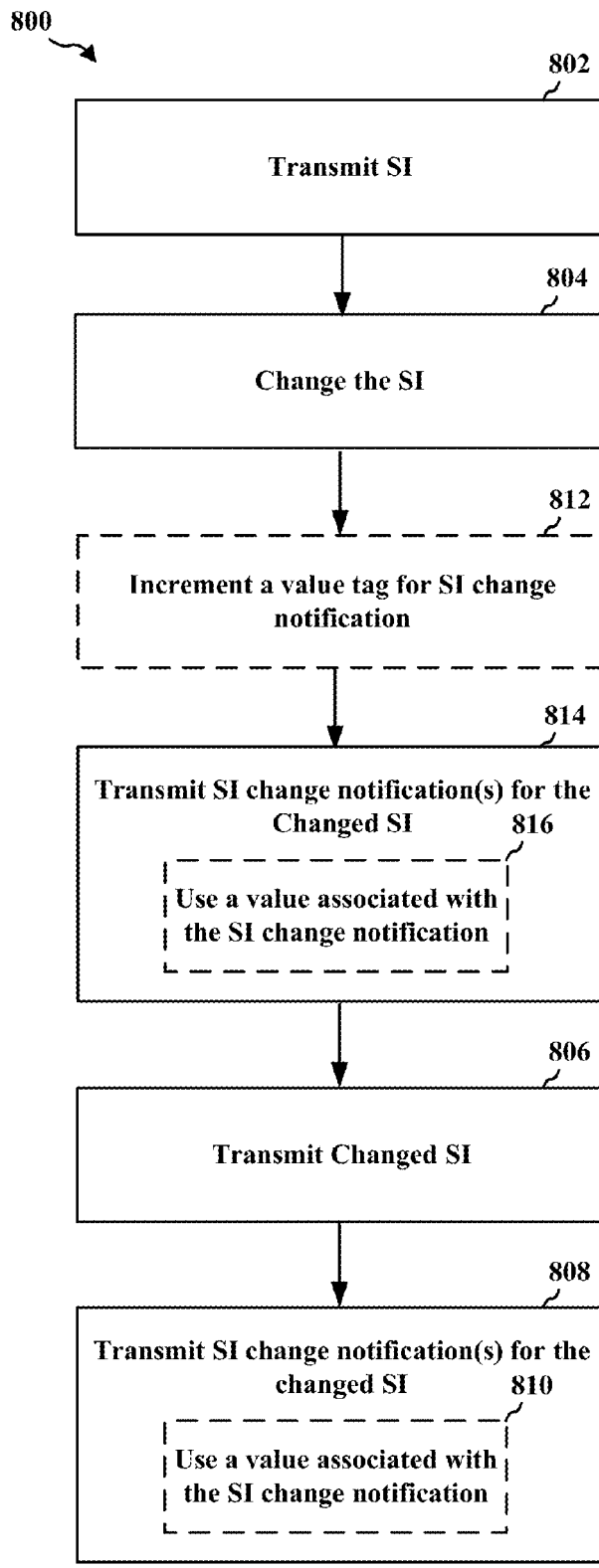
FIG. 8 is a flowchart of a method of wireless communication.

FIG. 8 is a flowchart 800 of a method of wireless communication. The method may be performed by a base station or eNB (e.g., the eNB 102, 310, 404, 604, the apparatus 902, 902'). Optional aspects of the method are illustrated with a dashed line. At 802, the eNB transmits SI. At 804, the eNB changes the SI during a period of eDRX by a UE. At 806, the eNB transmits the changed SI. At 808, the UE transmits at least one notification associated with the changed SI, e.g., to the eDRX UE, after the transmission of the changed SI. The transmission of the notification may be during a paging occasion for the UE. The eNB may transmit multiple notifications after the changed SI, in order to ensure that UEs in eDRX receive the notification and are able to acquire the changed SI. As an eDRX cycle may extend beyond a BCCH modification period, the base station may transmit the SI change notification in multiple BCCH modification periods. This may cause certain UEs to receive more than one notification. Therefore, the SI change notification may comprise a value associated with the changed SI. The value may comprise a value tag that is incremented with each change in the SI. Thus, at 812, the base station may increment a value tag for the SI change notification. This enables the receiving UE to determine whether it has already received this particular SI change notification.

The base station may transmit the SI change notification at 808 during an invariant PF or an invariant PO, as discussed in connection with FIG. 7. The base station may transmit the SI change notification at 808 during a PO for a UE performing eDRX. The base station may transmit a plurality of notifications associated with the SI change at 808. A first notification may be transmitted during an invariant PF or an invariant PO and a second notification may be transmitted during a PO for the UE performing eDRX, e.g., as illustrated in FIG. 7.

The base station may need to inform legacy UEs or UEs performing DRX rather than eDRX about the SI change in the BCCH modification period prior to the SI change. Therefore, the base station may also transmit the SI change notification at 814 prior to transmitting the changed SI at 806. The SI change notification at 814 may be different than the notification transmitted at 808. Alternately, the SI change notification transmitted at 814 prior to the SI change may be the same as the SI change notification transmitted at 808 after the SI change. Thus, the SI change notification at 814 may also comprise the value, e.g., at 816, indicating the SI change to which it applies. Similar to the notification at 808, the notification at 814 may involve transmitting a plurality of notifications during the BCCH modification period prior to the SI change.

Figure 9:
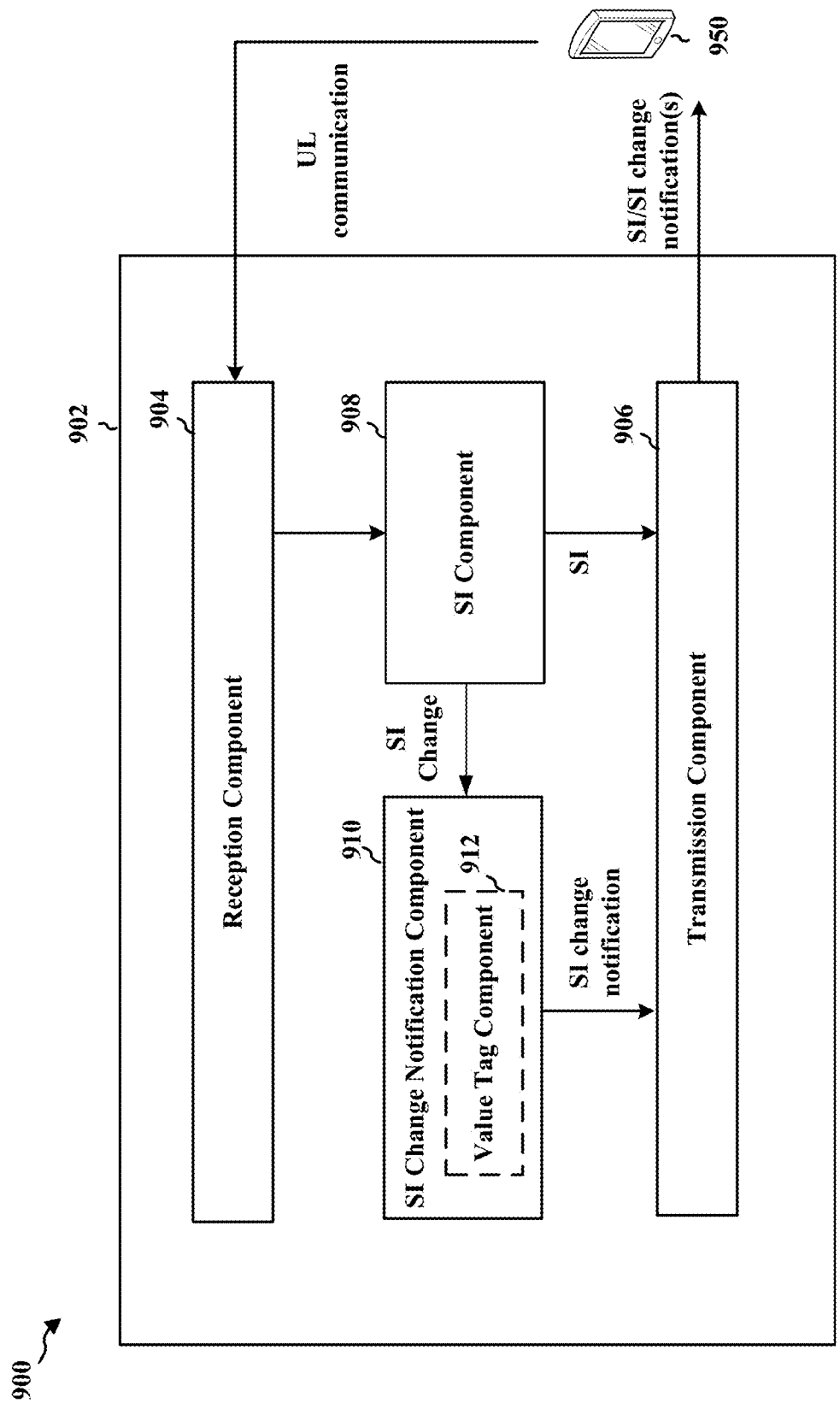
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be an eNB. The apparatus includes a reception component 904 that receives UL communication from UE(s) 950, and a transmission component 906 that transmits DL communication to UE(s) 950, including SI and SI change notifications. The apparatus includes an SI component 908 that transmits SI using transmission component. The SI component 908 may change the SI and transmit the changed SI using transmission component 906. The SI component 908 may change the SI during a period of eDRX by UE 950. The apparatus may include an SI change notification component 910 that transmits at least one notification associated with the changed SI after the transmission of the changed SI. The SI change notification component 910 may transmit the notification during a paging occasion for the UE 950. The SI component 908 may inform the SI change notification component 910 regarding a change to the SI, and the SI change notification component 910 may generate an SI change notification and transmit the SI change notification using transmission component 906. The SI change notification component 910 may include a value tag component 912 that includes a value associated with the changed SI in the SI change notification. The value may comprise a value tag, and the value tag component may increment the value tag with each change in SI.

The apparatus may include additional components that perform each of the blocks of the algorithm in the aforementioned flowchart of FIG. 8, as well as aspects of the flowcharts of FIGS. 6 and 7. As such, each block in the aforementioned flowchart of FIG. 8, as well as aspects of the flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
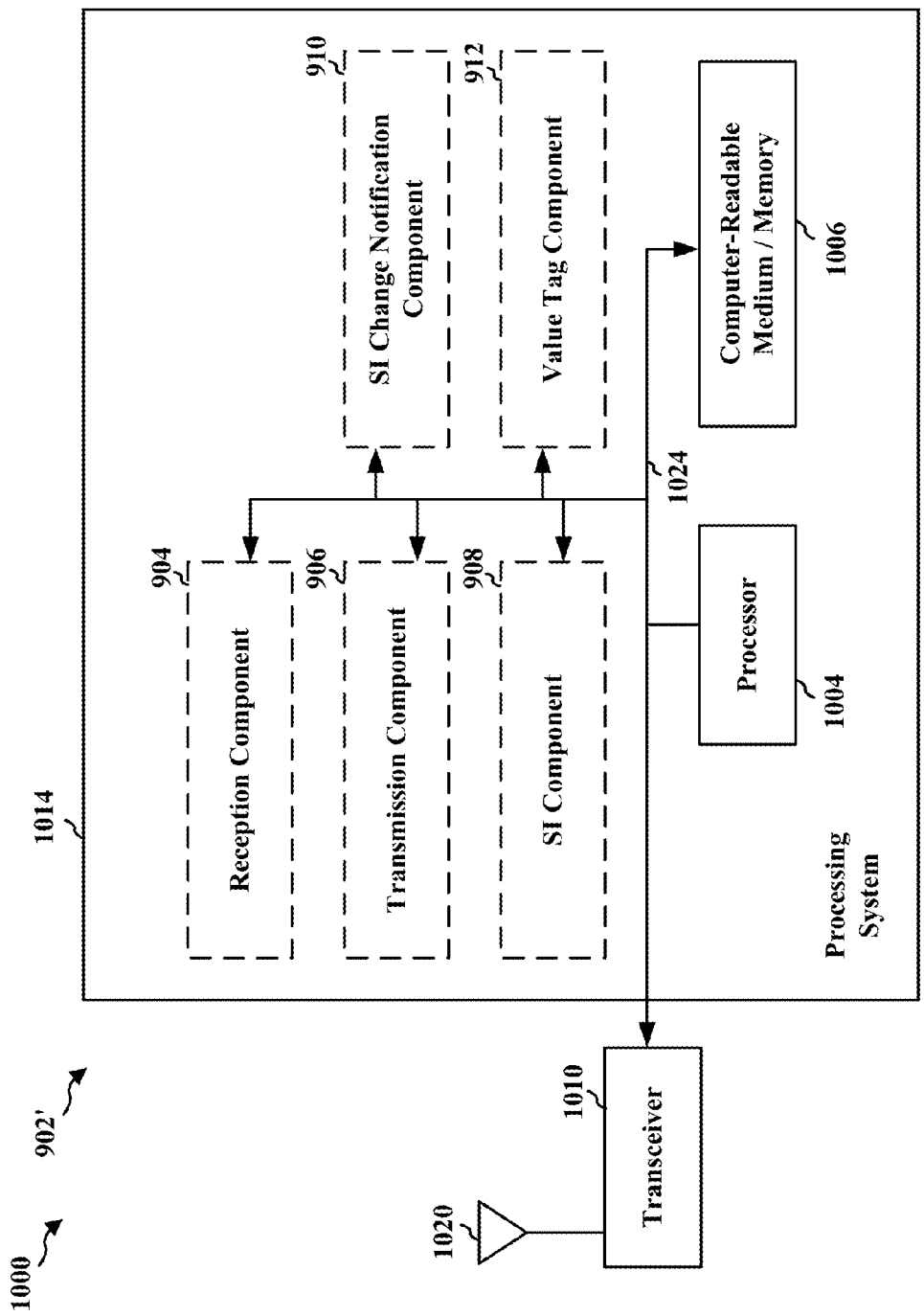
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the eNB 310 and may include the memory 376 and/or at least one of the TX processor 316, the RX processor 370, and the controller/processor 375.

In one configuration, the apparatus 902/902' for wireless communication includes means for transmitting SI, means for changing SI, means for transmitting the changed SI, and means for transmitting at least one notification associated with the changed SI after the transmission of the changed SI. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
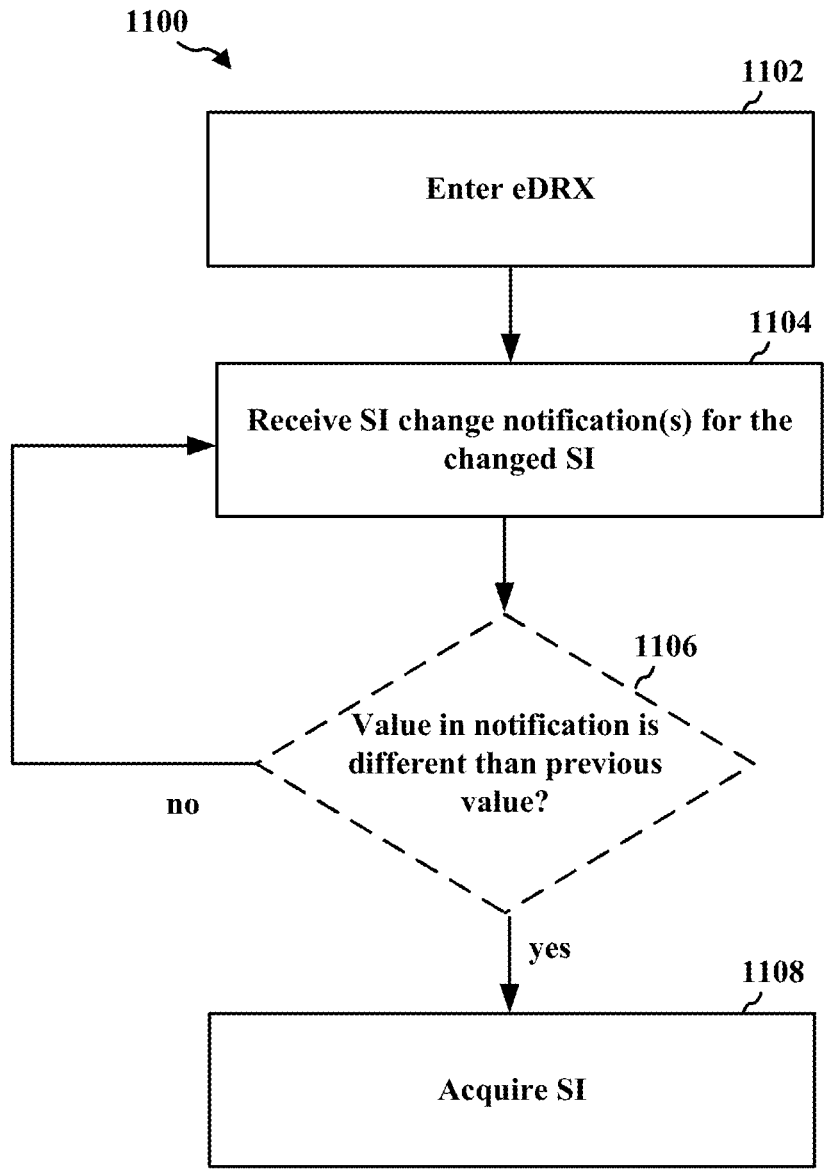
FIG. 11 is a flowchart of a method of wireless communication.

FIG. 11 is a flowchart 1100 of a method of wireless communication. The method may be performed by a UE (e.g., the UE 104, 350, 404, 602, 704, the apparatus 1202/ 1202'). At 1102, the UE enters into an eDRX cycle. When in eDRX, the UE may receive communication from an eNB and/or transmit communication to the eNB during a wake-up window. At other times, the UE may turn off its receiver and/or transmitter and enter a low power state. At 1104, the UE receives, after an SI change that occurs during the eDRX cycle, a notification associated with the SI change. The UE may then acquire the changed SI at 1108 using information in the notification.

The notification may comprise a value associated with the SI change. Thus, the UE may further determine if the value in the notification is different than a value associated with a previous notification at 1106.

When the value in the notification is different than the value associated with the previous notification, the UE acquires the changed SI at 1108. When the value is the same as the previous notification, the UE can refrain from acquiring the SI, because the value indicates that the SI is not different than the previously acquired SI. The value may comprise a value tag. The value tag may be incremented with each change in SI.

The notification received at 1104 may be received during an invariant PF or an invariant PO. The notification may be received during a PO for the UE. Therefore, the UE may monitor POs for the UE and/or invariant POs for a notification regarding a change in SI.

Figure 12:
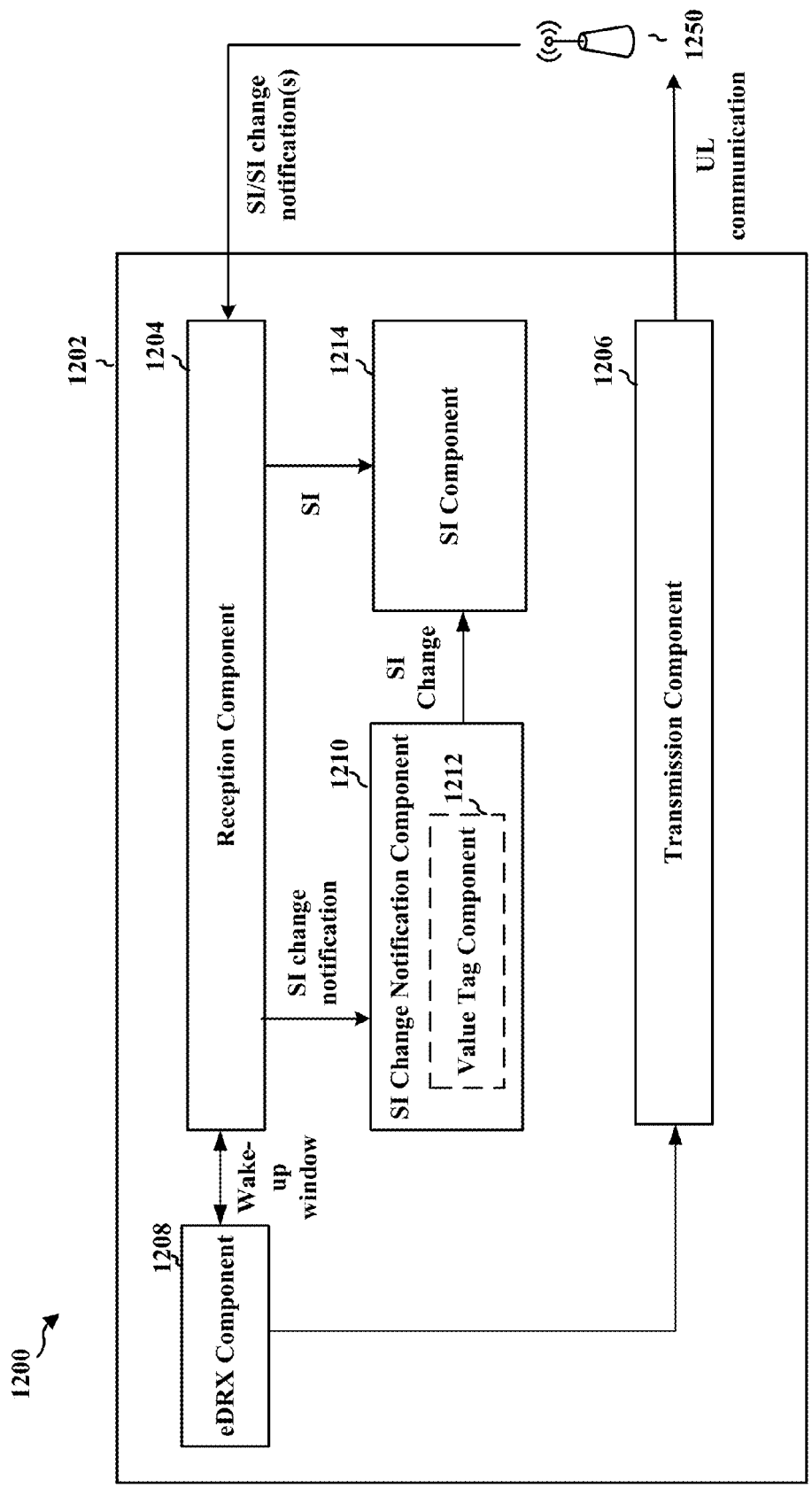
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204 that receives DL communication from eNB 1250, including SI and SI change notifications, and a transmission component 1206 that transmits UL communication to eNB 1250. The apparatus 1202 includes an eDRX component 1208 that causes the UE to enter into an eDRX cycle. The eDRX component 1208 may provide a wake-up window to the reception component 1204, during which the reception component monitors for DL transmissions from eNB 1250. At other times, the reception component may be turned off to reduce power consumption.

The apparatus may include an SI component 1214 that acquires SI that is received by reception component 1204. The apparatus may include an SI change notification component 1210 that receives a notification associated with SI changes. As the eDRX cycle may extend beyond an SI update period, e.g., a BCCH modification period, the notification may be received after the SI has been changed during the eDRX cycle. Thus, the apparatus may also include a value tag component 1212 that determines if a value comprised in the notification is different than a value associated with a previous notification. The value may comprise a value tag that increments each time the SI is changed. By determining whether the value has changed from a previous SI change notification, SI change notification component 1210 can determine whether a SI change has been made. If a change has been made, the SI change notification component 1210 can cause SI component 1214 to acquire the changed SI.

The apparatus may include additional components that perform each of the blocks of the algorithm in the aforementioned flowchart of FIG. 11, as well as aspects of the flowcharts of FIGS. 6 and 7. As such, each block in the aforementioned flowchart of FIG. 11, as well as aspects of the flowcharts of FIGS. 6 and 7, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
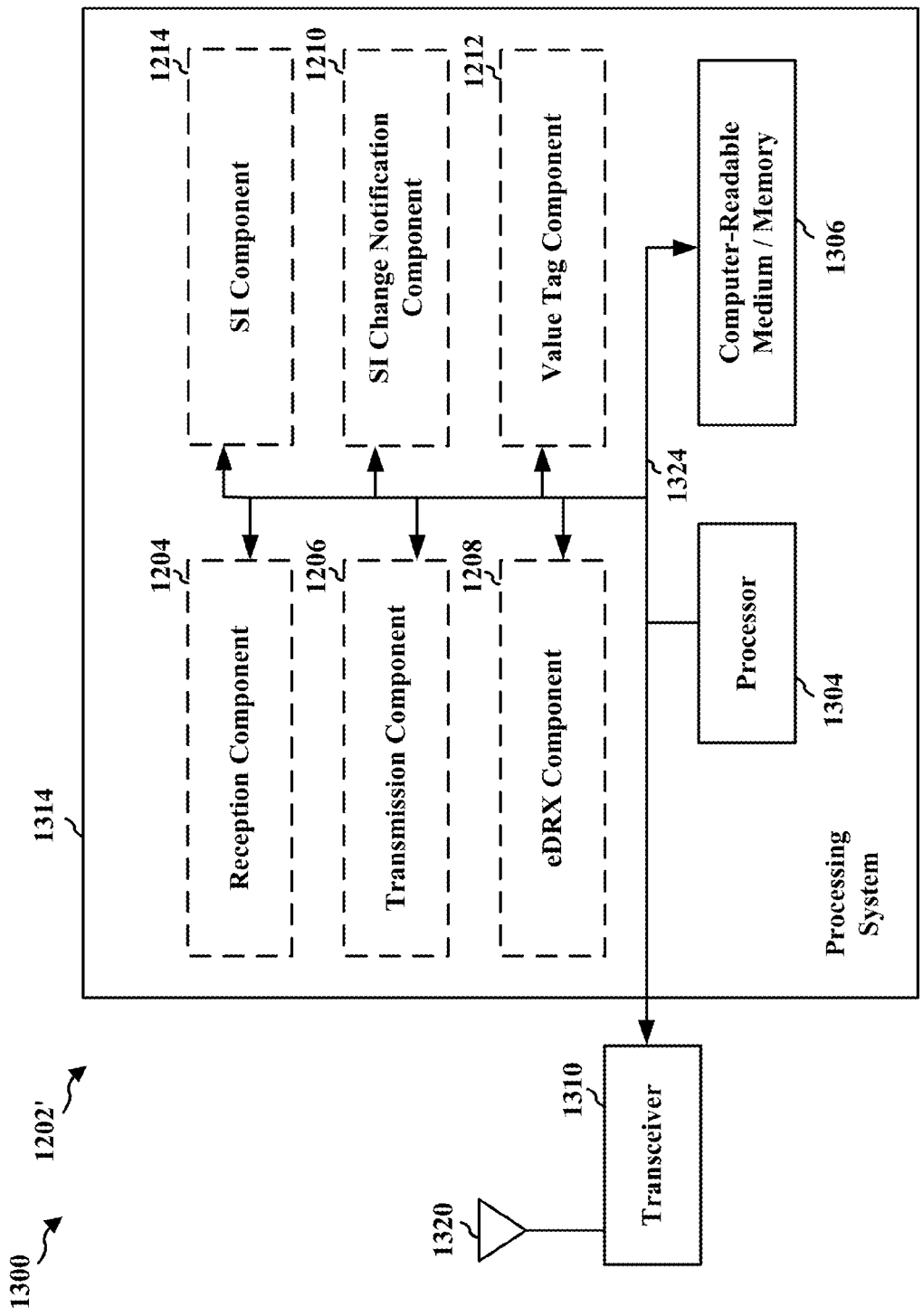
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for entering an eDRX cycle, means for receiving, after an SI change, a notification associated with the SI change, means for determining if a value in the notification is different than a value associated with a previous notification, and means for acquiring SI when the value in the notification is different than the value tag associated with the previous notification. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a base station, comprising:
    transmitting system information (SI);
    changing the SI during a period of extended discontinuous reception (eDRX) by a user equipment;
    transmitting the changed SI; and
    transmitting a plurality of notifications associated with the changed SI after the transmission of the changed SI, wherein a first notification is transmitted during an invariant paging frame or an invariant paging occasion after the transmission of the changed SI and a second notification is transmitted during a paging occasion for the user equipment.

2. The method of claim 1, wherein the plurality of notifications comprise a value that indicates the changed SI to which the notifications correspond.

3. The method of claim 2, wherein the value comprises a value tag, and wherein the value tag is incremented with each change in SI.

4. The method of claim 1, wherein the plurality of notifications comprise repetitions of a second SI change notification transmitted to a non-DRX UE.

5. The method of claim 1, wherein the plurality of notifications are separate from a second SI change notification transmitted to a non-DRX UE.

6. An apparatus for wireless communication, comprising:
a memory; and
at least one processor coupled to the memory and configured to:
transmit system information (SI);
change the SI during a period of extended discontinuous reception (eDRX) by a user equipment;
transmit the changed SI; and
transmit a plurality of notifications associated with the changed SI after the transmission of the changed SI, wherein a first notification is transmitted during an invariant paging frame or an invariant paging occasion after the transmission of the changed SI and a second notification is transmitted during a paging occasion for the user equipment.

7. The apparatus of claim 6, wherein the plurality of notifications comprise a value that indicates the changed SI to which the notifications correspond.

8. The apparatus of claim 7, wherein the value comprises a value tag, and wherein the value tag is incremented with each change in SI.

9. The apparatus of claim 6, wherein the plurality of notifications comprise repetitions of a second SI change notification transmitted to a non-DRX UE.

10. The apparatus of claim 6, wherein the plurality of notifications are separate from a second SI change notification transmitted to a non-DRX UE.

11. A method of wireless communications performed by a user equipment (UE), comprising:
entering into an extended discontinuous reception (eDRX) cycle;
checking for a system information (SI) change notification at a plurality paging occasions, wherein the plurality of paging occasions comprises a first occasion including an invariant paging frame or an invariant paging occasion and a second occasion including a paging occasion for the user equipment; and
receiving, after the SI change during the eDRX cycle, a notification associated with the SI change, wherein the notification comprises a value that indicates the SI change to which the notification corresponds.

12. The method of claim 11, the method further comprising:
determining if the value in the notification is different than a value associated with a previous notification; and
acquiring SI when the value in the notification is different than the value associated with the previous notification.

13. The method of claim 12, wherein the value comprises a value tag, and wherein the value tag is incremented with each change in SI.

14. The method of claim 11, wherein the notification is received during the invariant paging frame or the invariant paging occasion.

15. The method of claim 11, wherein the notification is received during the paging occasion for the UE.

16. The method of claim 11, wherein the notification comprises a repetition of a second SI change notification transmitted to a non-DRX UE.

17. The method of claim 11, wherein the notification is separate from a second SI change notification transmitted to a non-DRX UE.

18. An apparatus for wireless communication at a user equipment (UE), comprising:
a memory; and
at least one processor coupled to the memory and configured to:
enter into an extended discontinuous reception (eDRX) cycle;
check for a system information (SI) change notification at a plurality paging occasions, wherein the plurality of paging occasions comprises a first occasion including an invariant paging frame or an invariant paging occasion and a second occasion including a paging occasion for the user equipment; and
receive, after the SI, a notification associated with the SI change, wherein the notification comprises a value that indicates the SI change to which the notification corresponds.

19. The apparatus of claim 18, the at least one processor being further configured to:
determine if the value in the notification is different than a value associated with a previous notification; and
acquire SI when the value in the notification is different than the value associated with the previous notification.

20. The apparatus of claim 19, wherein the value comprises a value tag, and wherein the value tag is incremented with each change in SI.

21. The apparatus of claim 18, wherein the notification is received during the invariant paging frame or the invariant paging occasion.

22. The apparatus of claim 18, wherein the notification is received during the paging occasion for the UE.

23. The apparatus of claim 18, wherein the notification comprises a repetition of a second SI change notification transmitted to a non-DRX UE.

24. The apparatus of claim 18, wherein the notification is separate from a second SI change notification transmitted to a non-DRX UE.

* * * * *